US012756357B2

(12) United States Patent
Emanet et al.

(10) Patent No.: US 12,756,357 B2
(45) Date of Patent: Oct. 6, 2026

(54) SOLAR POWER GENERATION SYSTEM WITH SHUT-OFF DEVICES

(71) Applicant: OMRON Corporation, Kyoto (JP)

(72) Inventors: Nahit Emanet, East Greenwich, RI (US); Oezguer Aksoy, East Greenwich, RI (US); Mustafa Mihmanli, East Greenwich, RI (US); Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

(*) Notice: Subject to any disclaimer, the term of this patent is extended or adjusted under 35 U.S.C. 154(b) by 686 days.

(21) Appl. No.: 18/218,581

(22) Filed: Jul. 6, 2023

(65) Prior Publication Data

US 2024/0039467 A1 Feb. 1, 2024

(30) Foreign Application Priority Data

Jul. 29, 2022 (JP) ................................ 2022-121831

(51) Int. Cl.

| | |
|---|---|
| ***H02S 40/36*** | (2014.01) |
| ***H02J 1/102*** | (2026.01) |
| ***H02J 3/38*** | (2026.01) |
| ***H02J 101/24*** | (2026.01) |
| ***H02S 40/32*** | (2014.01) |

(52) U.S. Cl.
CPC .............. *H02S 40/36* (2014.12); *H02J 1/102* (2013.01); *H02J 3/381* (2013.01); *H02S 40/32* (2014.12); *H02J 2101/24* (2026.01)

(58) Field of Classification Search
None
See application file for complete search history.

(56) References Cited

U.S. PATENT DOCUMENTS

2011/0218687 A1* 9/2011 Hadar ..................... H02S 50/00
700/292

FOREIGN PATENT DOCUMENTS

| | | | |
|---|---|---|---|
| JP | 2012-511299 A | 5/2012 | |
| WO | 2010/065043 A1 | 6/2010 | |
| WO | WO-2010078303 A2 * | 7/2010 | .......... H02J 13/1331 |

* cited by examiner

*Primary Examiner* — David V Henze
(74) *Attorney, Agent, or Firm* — SHINJYU GLOBAL IP

(57) ABSTRACT

A solar power generation system includes a string, an inverter, and first and second shut-off devices. The string includes a plurality of solar cell module groups. The first shut-off device cuts off the connections between the plurality of solar cell module groups of a first electric path in response to a first control signal. The second shut-off device cuts off the connections between the plurality of solar cell module groups in a second electric path in response to a second control signal output by a different communication system. The first shut-off device includes a first open-close unit, a first semiconductor switching device connected in series to the first open-close unit and a power supply unit configured to generate power to drive the first open-close unit. The first semiconductor switching device enters an OFF state if the amount of generated power is smaller than a predetermined threshold value.

17 Claims, 8 Drawing Sheets

| OPERATION MODE | WEATHER SUNLIGHT | POWER GENERATION | CONTROL SIGNAL | RELAY OPERATION MODE | SEMICONDUCTOR SWITCH OPERATION MODE |
|---|---|---|---|---|---|
| START |  | YES | ON | ON | ON |
| ACTIVE |  | YES | ON | ON | ON |
| SAFETY — NORMAL CUT-OFF |  | NO | OFF | OFF | OFF |
| SAFETY — NORMAL CUT-OFF |  | UNSTABLE | ON | ON/OFF | OFF |
| SAFETY — EMERGENCY SAFETY CUT-OFF |  | YES | OFF | OFF | OFF |

SOLAR POWER GENERATION SYSTEM WITH SHUT-OFF DEVICES

CROSS-REFERENCES TO RELATED APPLICATIONS

This application claims priority under 35 U.S.C. § 119 to Japanese Patent Application No. 2022-121831 filed on Jul. 29, 2022. The entire disclosure of Japanese Patent Application No. 2022-121831 is incorporated herein by reference.

FIELD

The present invention relates to a solar power generation system.

BACKGROUND

In the United States, for the purpose of protecting firefighters from electric shock in an emergency such as a fire, the introduction into a solar power generation system of a so-called rapid shutdown function for immediately stopping the power generation by a solar power generation system in an emergency is mandated by National Electrical Code (NEC). For example, Published Japanese Translation No. 2012-511299 of the PCT International Publication discloses a solar power generation system in which the output of power from solar cell modules to an inverter is stopped according to the operating state of the inverter.

SUMMARY

In a solar power generation system, in order to further improve the safety of firefighters in the event of a fire, for example, preferably a shut-off device having the rapid shutdown function is installed for each solar cell module. However, the shut-off device for each solar cell module increases the installation cost of the shut-off devices.

Further, the shut-off device of a solar power generation system uses a switching element for opening and closing a mechanical contact such as a relay, as a switching element for cutting off an electric circuit in the solar power generation system. The power for driving the switching element is supplied from the solar cell modules of the solar power generation system. That is, the power generated by the solar cell modules is used for driving an external device (for example, an inverter) and driving the switching element. In this case, if the amount of power generated by the solar cell modules drops for some reason and the power required to drive the switching element is no longer supplied to the switching element, for example, a phenomenon, in which even if an attempt is made to close the contact of the switching element with the power from the solar cell modules (even if an attempt is made to turn the switching element into an ON state), the contact is opened immediately (the switching element is turned into an OFF state), and this closing and opening may be repeated. Further, when the amount of power generated by the solar cell modules becomes unstable, the switching element may be repeatedly switched between the ON state and the OFF state. The occurrence of this phenomenon makes the operation of the solar power generation system unstable, for example, thereby hindering the operation of the solar power generation system.

An object of the claimed invention is to provide a solar power generation system that decreases the installation cost of shut-off devices and that improves stability of the solar power generation system.

The solar power generation system according to one aspect of the present invention includes a string, an inverter, a first shut-off device, and a second shut-off device. The string includes a plurality of solar cell module groups connected in series with each other. The plurality of solar cell module groups each include one or a plurality of solar cell modules connected in series. The inverter is connected to the string for converting DC power output from the solar cell modules to AC power. The first shut-off device is connected to a first electric path connecting between the plurality of solar cell module groups. The second shut-off device is connected to a second electric path connecting between a plurality of solar cell module groups different from the plurality of solar cell module groups connected to the first electric path. The plurality of solar cell module groups in the string each have an open circuit voltage equal to or less than a predetermined open circuit voltage. The first shut-off device cuts off the connections between the plurality of solar cell module groups connected to the first electric circuit, in response to a first control signal from the inverter. The second shut-off device cuts off the connections between the solar cell module groups connected to the second electric circuit, in response to a second control signal output from the first shut-off device by a communication system different from power line communication via a communication line connected to the first shut-off device and the second shut-off device.

The plurality of solar cell module groups in the string includes a first group. The first shut-off device includes: a first open-close unit connected to an anode-side terminal of the first group; a first semiconductor switching device connected in series between the anode-side terminal of the first group and the first open-close unit; and a first power supply unit configured to generate power to drive the first open-close unit, the first power supply unit having an anode-side terminal connected between the anode-side terminal of the first group and the first semiconductor switching device and a cathode-side terminal connected to a cathode-side terminal of the first group. The first semiconductor switching device enters an OFF state in a case where an amount of power generated by the first group falls below a predetermined threshold value.

In this solar power generation system, the first shut-off device and the second shut-off device are in a master-slave relationship, and the second shut-off device cuts off the connections between the plurality of solar cell module groups in response to the second control signal output from the first shut-off device. As such, the configuration of the second shut-off device can be simplified, thereby reducing the installation cost of the second shut-off device. In addition, since each of the plurality of solar cell module groups has an open-circuit voltage equal to or less than a predetermined open-circuit voltage, a highly safe solar power generation system can be provided. The second control signal from the first shut-off device is output by a communication system different from power line communication via a communication line, and thereby the signal is unlikely to be affected by noise as compared with the power line communication, and the communication from the first shut-off device to the second shut-off device can be stabilized.

In the solar power generation system, the first semiconductor switching device of the first shut-off device enters an OFF state in the case where the amount of power generated by the first group connected to the first shut-off device falls below a predetermined threshold value. Thus, when the amount of power generated by the first group is small, the electric circuit from the first group to the inverter is cut off, and the first group can supply the power only to the first power supply unit. That is, when the amount of power generated by the first group is small, the power generated by the first group is used only to drive the open-close unit. As a result, the first open-close unit can be maintained in the closed state (ON state) even if the amount of power generated by the first group is small or unstable. As a result, the solar power generation system operates stably.

The first shut-off device may include a first bypass device. The first bypass device is connected at one end to the cathode-side terminal of the first group. The other end of the first bypass element is connected between the first open-close unit and the first semiconductor switching device. In this case, even if the amount of power generated by the first group decreases, the power generated by another solar cell module group can be transferred to the inverter via the first bypass device.

The first semiconductor switching device may be a MOSFET device or an IGBT device. These devices can reduce the power required to turn the semiconductor switching device into an ON state or an OFF state.

The first shut-off device may include a second open-close unit connected to the cathode-side terminal of the first group. In this case, a plurality of electric circuits can be opened and closed by the single first shut-off device.

The second open-close unit may be driven by the power supplied from the first power supply unit. In this case, when the first shut-off device is disposed, additional wiring for supplying power to drive the open-close unit can be omitted. Thus, the installation cost of the first shut-off device can be reduced. Further, the drive voltage range of the first shut-off device can be narrowed, reducing the manufacturing cost of the first shut-off device.

The first shut-off device may be configured to control the opening and closing of the first open-close unit and the second open-close unit independently of each other. In this case, for example, when a defect such as a contact failure occurs in the first open-close unit, it is possible to continue to use the second open-close unit that is operating normally.

The plurality of solar cell module groups in the string may include a second group. The second shut-off device may include a third open-close unit connected to an anode-side terminal of the second group, a second semiconductor switching device connected in series between the anode-side terminal of the second group and the third open-close unit, and a power supply unit having an anode-side terminal connected to the anode-side terminal of the second group and the second semiconductor switching element and a cathode-side terminal connected the cathode-side terminal of the second group, the power supply unit being configured to generate power to drive the second open-close unit. The second semiconductor switching device may enter the OFF state when the amount of power generated by the second group falls below a predetermined threshold value. In this case, when the amount of power generated by the second group is small, the power generated by the second group is used only to drive the open-close unit. As long as the power generated by the second group is supplied only to drive the open-close unit, the third open-close unit can be maintained in the closed state (ON state) even if the power generated by the second group is small or unstable.

The second shut-off device may include a second bypass device. The second bypass device is connected at one end to the cathode-side terminal of the second group. The other end of the second bypass element is connected between the third open-close unit and the second semiconductor switching device. In this case, even if the amount of power generated by the second group drops, the power generated by another solar cell module group can be transferred to the inverter via the second bypass element.

The second semiconductor switching device may be a MOSFET device or an IGBT device. These devices can reduce the power required to turn the second semiconductor switching device into an ON state or an OFF state.

The second shut-off device may include a fourth open-close unit connected to the cathode-side terminal of the second group. In this case, a plurality of electric circuits can be opened and closed by the single first shut-off device.

The fourth open-close unit may be driven by the power supplied from a second power supply unit. In this case, when the second shut-off device is disposed, additional wiring for supplying power to drive the open-close unit can be omitted. As a result, the installation cost of the second shut-off device can be reduced. Further, since the drive voltage range of the second shut-off device can be narrowed, reducing the manufacturing cost of the second shut-off device.

The second shut-off device may be configured to control the opening and closing of the third open-close unit and the fourth open-close unit independently of each other. In this case, for example, when a defect such as a contact failure occurs in the third open-close unit, it is possible to continue to use the fourth open-close unit that is operating normally.

The first shut-off device may cut off the connections between the plurality of solar cell module groups connected to the first electric circuit in response to the first control signal from the inverter, and then output the second control signal to the second shut-off device. In this case, the voltage applied to the second shut-off device can be decreased. With the configuration, the cost of the second shut-off device can be reduced.

The plurality of solar cell module groups in the string may each have an open circuit voltage of 165 V or less. In this case, a safer solar power generation system can be provided.

The inverter may output the first control signal to the first shut-off device by power line communication. In this case, when the first shut-off device is disposed in an existing solar power generation system, the additional wiring for ensuring the communication between the inverter and the first shut-off device can be omitted, which reduces the installation cost of the first shut-off device.

The inverter may output the first control signal to the first shut-off device by wireless communication. In this case, the first control signal can be output to the first shut-off device by remote control.

At least one of the plurality of solar cell module groups in the string may include a plurality of solar cell modules connected in series. In this case, the plurality of solar cell modules can be cut off by the first shut-off device or the second shut-off device.

According to the present invention, a solar power generation system is provided that achieves both the decrease in installation cost of shut-off devices and the improvement of stability of the solar power generation system.

DETAILED DESCRIPTION

Figure 1:
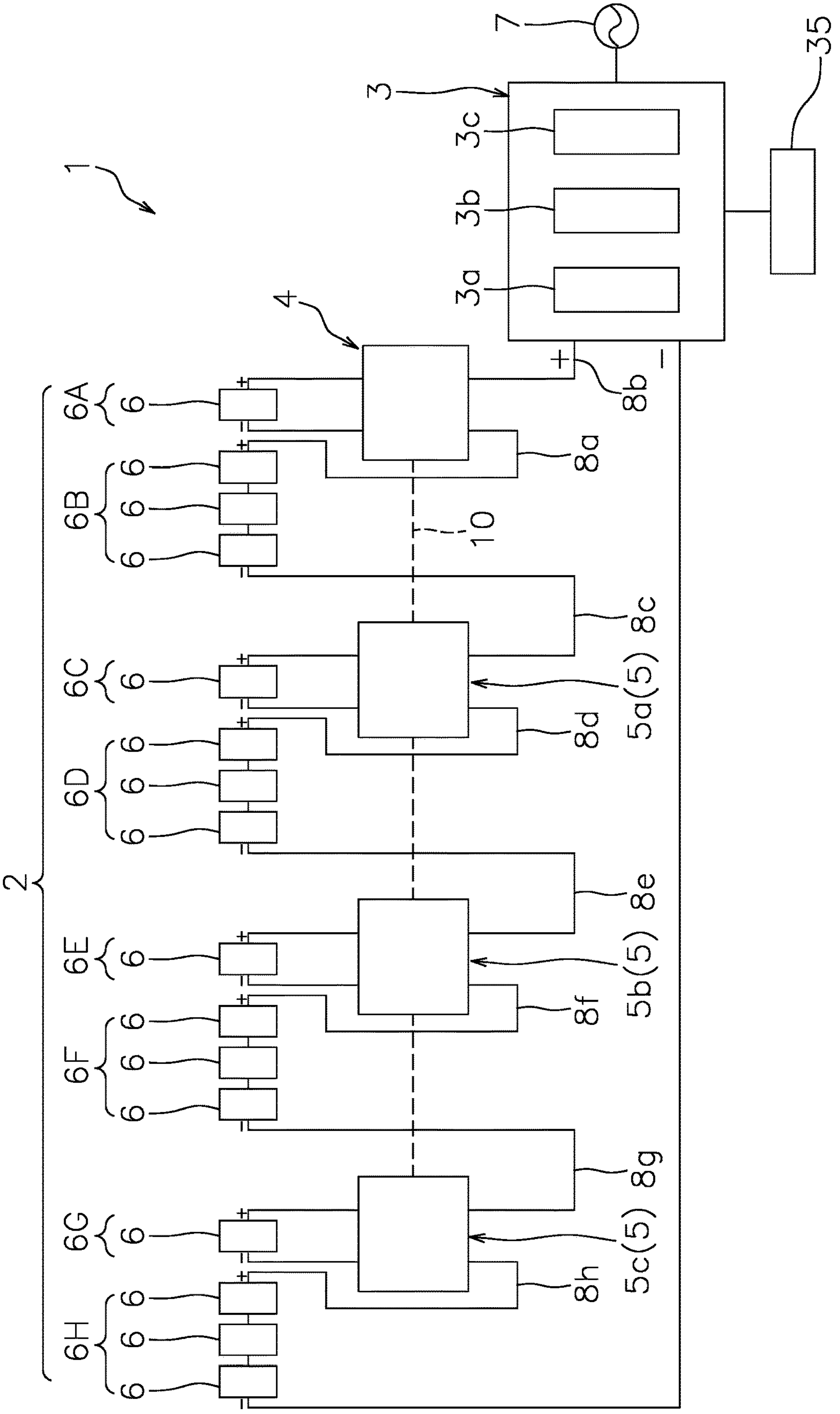
FIG. 1 is a block diagram schematically showing a configuration of a solar power generation system according to an aspect of the present invention.

FIG. 1 is a block diagram schematically illustrating an exemplary configuration of a solar power generation system 1 in accordance with the claimed invention. The solar power generation system 1 includes a string 2, an inverter 3, a first (i.e., primary) shut-off device 4, and a plurality of second (i.e., secondary) shut-off devices 5.

The string 2 includes a plurality of solar cell module groups 6A to 6H connected in series with each other. Each of the solar cell module groups 6A to 6H includes one or more solar cell modules 6 connected in series. That is, the string 2 includes a plurality of (for example, 16 in the present embodiment) solar cell modules 6 connected in series with each other. Note that the solar power generation system 1 may include a solar cell array in which a plurality of strings 2 are connected in parallel.

The plurality of solar cell module groups 6A to 6H have an open circuit voltage, for each group, equal to or less than a predetermined open circuit voltage. The predetermined open circuit voltage may, for example, be 165 V. That is, in the string 2, the plurality of solar cell module groups is divided into groups so that each group has an open circuit voltage of 165 V or less. The solar cell modules 6 each have an open circuit voltage of 50 V, for example. Hereinafter, the solar cell module groups 6A to 6H may be referred to as groups 6A to 6H.

Each of the groups 6A, 6C, 6E, and 6G includes one solar cell module 6. Each of the groups 6B, 6D, 6F, and 6H includes three solar cell modules 6 connected in series with each other. Thus, the open circuit voltage of each of the groups 6A, 6C, 6E, 6G is 50 V, and the open circuit voltage of each of the groups 6B, 6D, 6F, 6H is 150 V.

The groups 6A to 6H are arranged in alphabetical order from the group 6A to the group 6H and are connected in series with each other. The groups 6A to 6H each include an anode-side terminal and a cathode-side terminal. The anode-side terminal in each of the groups 6A to 6H corresponds to the anode-side terminal of the solar cell modules 6 closest to the anode of the inverter 3 among the plurality of solar cell modules 6 in the groups 6A to 6H. The cathode in each of the groups 6A to 6H corresponds to the cathode-side terminal of the solar cell modules 6 farthest from the anode of the inverter 3 among the plurality of solar cell modules 6 in the groups 6A to 6H.

For example, the anode-side terminal of the group 6A corresponds to the anode-side terminal of a solar cell module 6 in the group 6A. The anode-side terminal of the group 6A is connected to the anode-side terminal of the inverter 3. The cathode-side terminal of the group 6A corresponds to the cathode-side terminal of a solar cell module 6 in the group 6A. The cathode-side terminal of the group 6A is connected to the anode-side terminal of the group 6B.

For example, the anode-side terminal of the group 6B corresponds to the anode-side terminal of the solar cell module closest to the group 6A among the solar cell modules 6 in the group 6B. The cathode-side terminal of the group 6B corresponds to the cathode-side terminal of the solar cell module farthest from the group 6A among the solar cell modules 6 in the group 6B. The cathode-side terminal of the group 6B is connected to the anode-side terminal of the group 6C.

The cathode-side terminal of the group 6C is connected to the anode-side terminal of the group 6D. The cathode-side terminal of the group 6D is connected to the anode-side terminal of the group 6E. The cathode-side terminal of the group 6E is connected to the anode-side terminal of the group 6F. The cathode-side terminal of the group 6F is connected to the anode-side terminal of the group 6G. The cathode-side terminal of the group 6G is connected to the anode-side terminal of the group 6H. The cathode-side terminal of the group 6H is connected to the cathode-side terminal of the inverter 3.

The solar cell modules 6 receive sunlight to generate power, and they output the generated power to the inverter 3. The inverter 3 is connected to the string 2 via a power line. The inverter 3 converts the DC power from the solar cell modules 6 in the string 2 into AC power. The inverter 3 is connected to a power system 7 and supplies the AC power to the commercial power system and load devices.

Specifically, the inverter 3 includes a DC/DC converter 3*a*, a DC/AC inverter 3*b*, and a control unit 3*c*. The DC/DC converter 3*a* converts the voltage of the power output from the solar cell modules 6 into a predetermined voltage and inputs it to the DC/AC inverter 3*b*. The DC/AC inverter 3*b* converts the DC power output from the solar cell modules 6 into AC power via the DC/DC converter 3*a*. The control unit 3*c* includes a CPU and memory and controls the DC/DC converter 3*a* and the DC/AC inverter 3*b*. The control unit 3*c* outputs a first control signal to the first shut-off device 4 by power line communication.

The first shut-off device 4 is connected to electric paths connecting between the groups 6A to 6H. In the present embodiment, the first shut-off device 4 is connected to an electric path 8*a* connecting the group 6A and the group 6B and an electric path 8*b* connecting the inverter 3 and the group 6A. The first shut-off device 4 cuts off the connection between the group 6A and the group 6B and the connection between the inverter 3 and the group 6A in response to a first control signal from the inverter 3.

The first shut-off device 4 outputs a second control signal to the plurality of second shut-off devices 5 via a communication line 10 connected to the first shut-off device 4 and the plurality of second shut-off devices 5 by a communication system different from power line communication. The first shut-off device 4*a* outputs the second control signal to the second shut-off device 5*a* using, for example, a serial communication method such as Local Interconnect Network (LIN) communication or Serial Peripheral Interface (SPI) communication. The first shut-off device 4 cuts off the connection between the group 6A and the group 6B and the connection between the inverter 3 and the group 6A, and then outputs the second control signal to the plurality of second shut-off devices 5. The first shut-off device 4 is connected to the plurality of second shut-off devices 5 via the communication line 10.

The first shut-off device 4 and the plurality of second shut-off devices 5 are in a master-slave relationship. The first shut-off device 4 functions as a master for the second shut-off devices 5, and the plurality of second shut-off devices 5 function as slaves to the first shut-off device 4. That is, the first shut-off device 4 controls the plurality of second shut-off devices 5.

Figure 2:
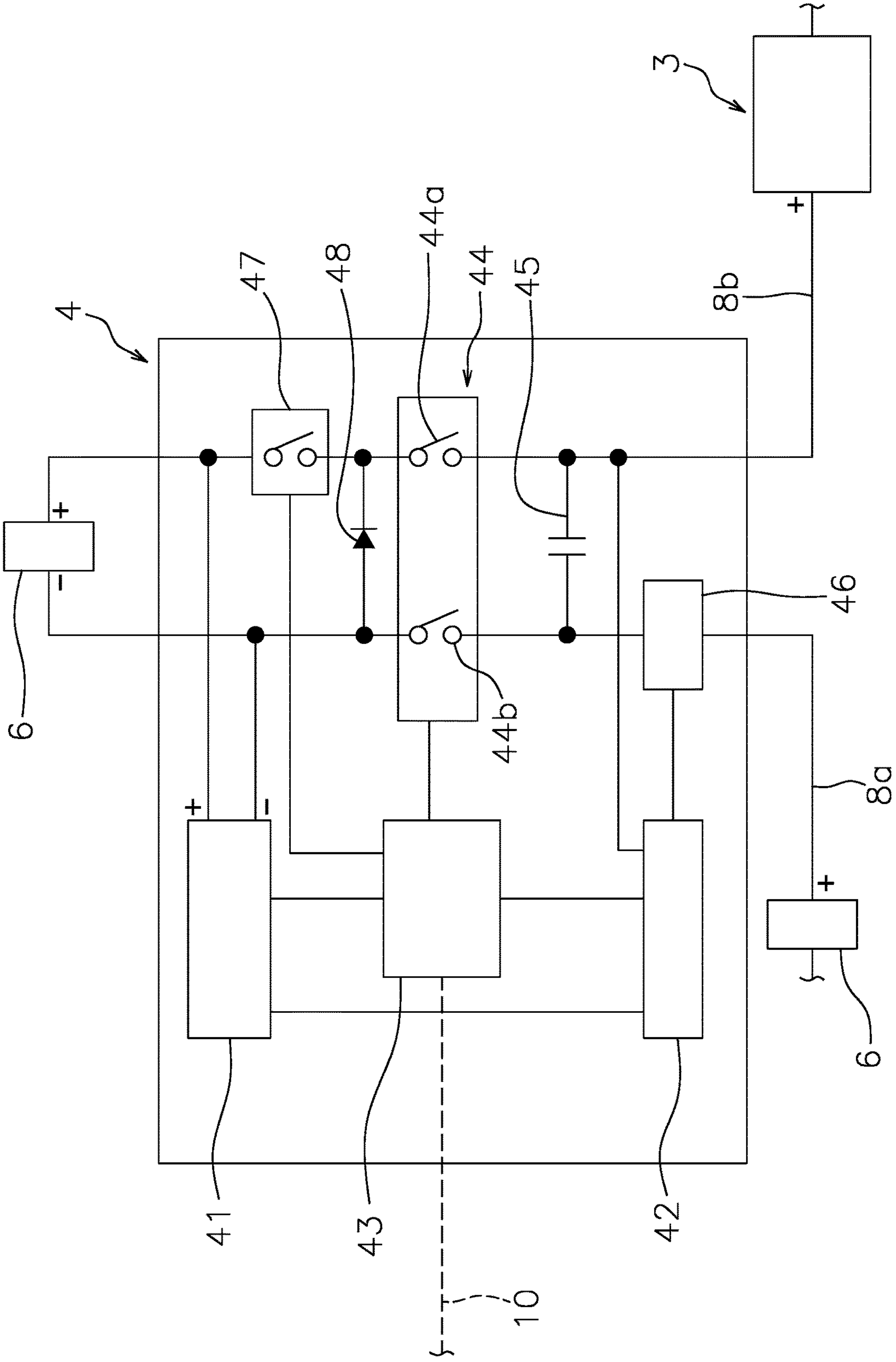
FIG. 2 is a block diagram schematically showing a configuration of a first shut-off device.

FIG. 2 is a block diagram schematically showing a configuration of the first shut-off device 4. The first shut-off device 4 includes a power supply unit 41 (an example of the first power supply unit), a signal-receiving unit 42, a control unit 43, a relay 44, a bypass circuit 45, a first semiconductor switching device 47, and a first bypass device 48.

Figure 3:
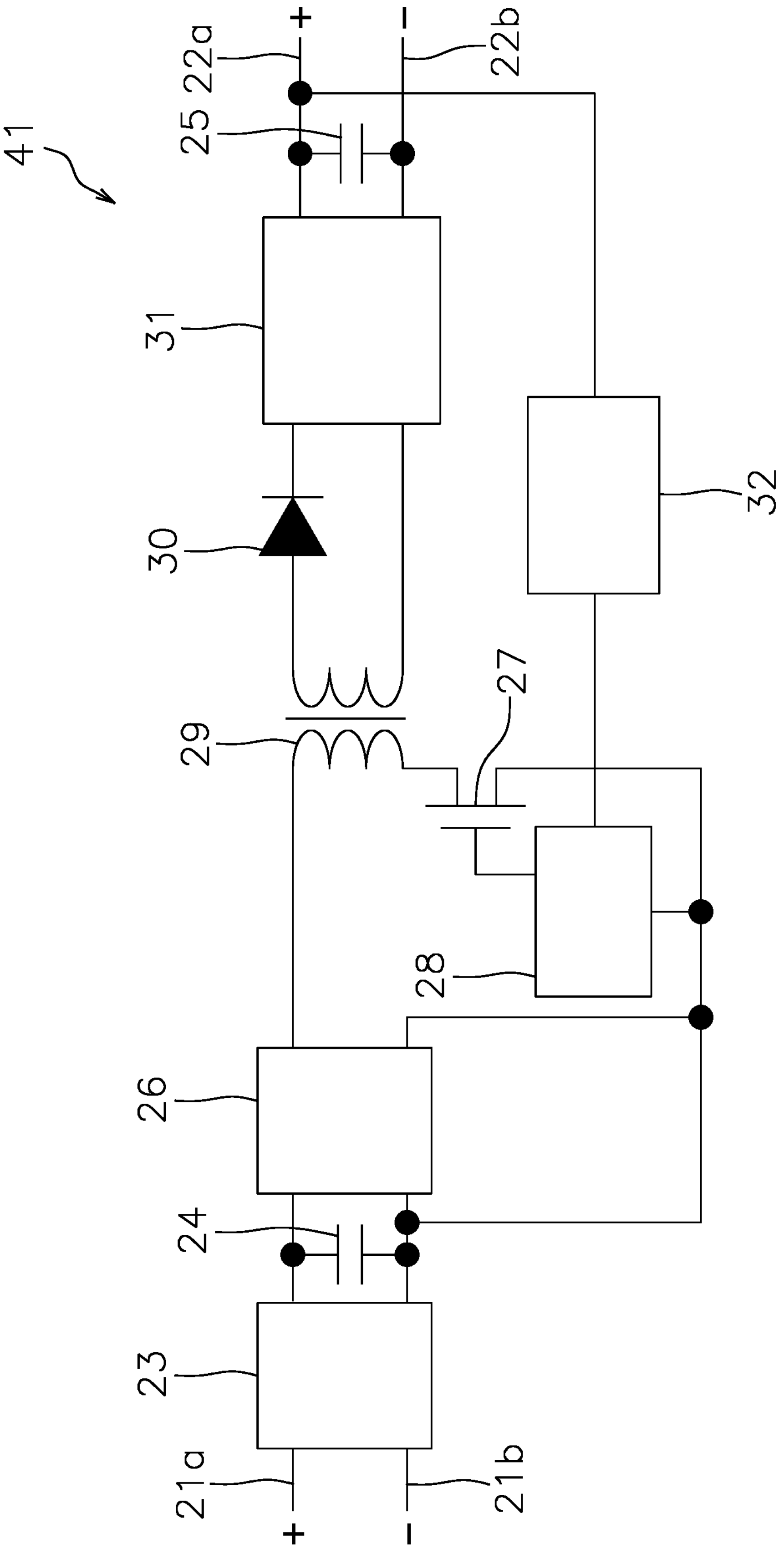
FIG. 3 is a circuit diagram schematically showing a configuration of a regulator.

The power supply unit 41 may be a regulator connected in parallel to the solar cell module group. Specifically, the power supply unit 41 has an anode-side terminal connected to the anode-side terminal of the group 6A, and a cathode-side terminal connected to the cathode-side terminal of the group 6A. The power supply unit 41 is configured, for example, in a circuit as shown in FIG. 3. FIG. 3 is a circuit diagram schematically showing a configuration of the power supply unit 41. The power supply unit 41 includes input terminals 21*a* and 21*b*, output terminals 22*a* and 22*b*, a line filter 23, capacitors 24 and 25, a booster circuit 26, a switching device 27, a control circuit 28, a transformer 29, a diode 30, and a DC/DC converter 31, and a feedback circuit 32.

The power supply unit 41 uses the power generated by the solar cell modules 6 as a power source to generate drive power to drive the first shut-off device 4. Here, only the power generated by the solar cell modules 6 of the group 6A is used to generate the drive power to drive the first shut-off device 4.

The signal-receiving unit 42 receives the first control signal from the control unit 3*c* of the inverter 3 and outputs the received first control signal to the control unit 43. Specifically, the signal-receiving unit 42 receives the first control signal from the control unit 3*c* of the inverter 3 via a signal detection unit 46 that detects a first control signal from the control unit 3*c* of the inverter 3.

The control unit 43 includes a CPU and memory. The control unit 43 controls the electric current flowing through the coil in the relay 44 based on the signals output from the signal reception unit 42, and controls the opening and closing of the contacts of the relay 44. The relay 44 is, for example, a mechanical relay and is able to open and close a high-voltage direct current. The control unit 43 receives, from the power supply unit 41, a power supply to drive the relay 44.

The control unit 43 outputs the second control signal to the plurality of second shut-off devices 5 via the communication line 10 by a communication system different from power line communication. The control unit 43 cuts off the connection between the group 6A and the group 6B, and then outputs the second control signal to the plurality of second shut-off devices 5. The control unit 43 determines whether or not the connection between the group 6A and the group 6B is cut off by monitoring the voltage between the contacts of the relay 44, for example.

The relay 44 includes a first open-close unit 44*a* and a second open-close unit 44*b*. The first open-close unit 44*a* is arranged in the electric path 8*b* to which the anode-side terminal of the group 6A is connected and opens and closes the connection between the inverter 3 and the group 6A. The second open-close unit 44*b* is arranged in the electric path 8*a* to which the cathode-side terminal of the group 6A is connected and opens and closes the connection between the group 6A and the group 6B. In the present embodiment, the second open-close unit 44*b* may be omitted.

While the drive power is not supplied from the power supply unit 41, the first open-close unit 44*a* and the second open-close unit 44*b* are in the open state all the time. Accordingly, while the first shut-off device 4 is not driven, the connection between the inverter 3 and the group 6A and the connection between the group 6A and the group 6B are in a cutoff state.

The bypass circuit 45 is a circuit to allow the signal-receiving unit 42 to receive the first control signal from the control unit 3*c* when the first shut-off device 4 is in the cutoff state. While the electric paths 8*a* and 8*b* are in the cutoff state by the first shut-off device 4, the signal-receiving unit 42 is able to receive the first control signal from the control unit 3*c* via the bypass circuit 45.

The first semiconductor switching device 47 is connected in series with the first open-close unit 44*a* in the electric path 8*b*. Specifically, the first semiconductor switching device 47 is connected to, at one end, the anode-side terminal of group 6A. The other end of the first semiconductor switching device 47 is connected to the first open-close unit 44*a*. The first semiconductor switching device 47 is, for example, an MOSFET device or an Insulated Gate Bipolar Transistor (IGBT) device.

The first semiconductor switching device 47 is connected to the control unit 43. The control unit 43 controls to switch between the ON state and the OFF state of the first semiconductor switching device 47. Here, the "ON state" means that one end and the other end of the first semiconductor switching device 47 are in a conductive state. The "OFF state" means that one end and the other end of the first semiconductor switching device 47 are in a non-conducting state.

When the first semiconductor switching device 47 is a MOSFET device or an IGBT device, the control unit 43 is connected to a gate terminal of the first semiconductor switching device 47. The control unit 43 can turn the first semiconductor switching device 47 into an ON state or an OFF state by outputting a predetermined voltage signal to the gate terminal. When a voltage signal is output to the gate terminal to turn the MOSFET device or the IGBT device into the ON state or the OFF state, almost no current flows through the gate terminal. Thus, the MOSFET device or the IGBT device as the first semiconductor switching device 47 can reduce the power required to turn the first semiconductor switching device 47 into the ON state or the OFF state.

In the first shut-off device 4, when the first semiconductor switching device 47 is turned OFF, the anode-side terminal of the group 6A and the inverter 3 are cut off. Even if the first semiconductor switching device 47 is turned OFF, however, the power supply unit 41 is not cut off from the group 6A. That is, in a case where the first semiconductor switching device 47 is in the OFF state, the power generated by the group 6A is supplied to the power supply unit 41 but not to the inverter 3.

The control unit 43 turns the first semiconductor switching device 47 into an OFF state in a case where the amount of power generated by the group 6A is smaller than a predetermined threshold. Thus, when the amount of power generated by the group 6A is smaller than the predetermined threshold, the power of the group 6A is supplied only to the first shut-off device 4 (the power supply unit 41). With this configuration, when the amount of power generated by the group 6A is small, the power from the group 6A can be used only to drive the first open-close unit 44*a* and the second open-close unit 44*b*. When the power from the group 6A is supplied only to the first open-close unit 44*a* and the second open-close unit 44*b*, even if the amount of power generated by the group 6A is small or unstable, the first open-close unit 44*a* and the second open-close unit 44*b* can be maintained in the closed state (ON state). As a result, the solar power generation system 1 operates stably. The above threshold can be set, for example, as the amount of power with which the first open-close unit 44*a* and the second open-close unit 44*b* operate stably even if the power of the group 6A is supplied to both of the power supply unit 41 and the inverter 3.

Further, since the first shut-off device 4 includes the first semiconductor switching device 47, the first open-close unit 44*a* and the second open-close unit 44*b* are maintained in the closed state (ON state) even if there occurs an abnormality in the amount of power generated by the group 6A. Thus, the first open-close unit 44*a* and the second open-close unit 44*b* are less likely to open and close while a high voltage is applied to these open-close units. As such, the first open-close unit 44*a* and the second open-close unit 44*b* are not required to have a large voltage-carrying capacity and can be inexpensive.

The first bypass device 48 is connected in parallel to the group 6A. Specifically, the first bypass device 48 is connected, at one end, between the cathode-side terminal of group 6A and the second open-close unit 44*b*. The other end of the first bypass device 48 is connected between the first open-close unit 44*a* and the first semiconductor switching device 47. The first bypass device 48 may, for example, be a diode having an anode connected to the cathode side of group 6A and a cathode connected between the first open-close unit 44*a* and the first semiconductor switching device 47.

When the solar cell modules of the group 6A are shaded at sunrise or sunset, sometimes sufficient power cannot be output from the group 6A due to an abnormality such as a sudden power drop or abnormal heat generation in the group 6A. At that time, the bypass device 48 forms an electric path that "bypasses" the group 6A and transfers the power generated by the other solar cell module groups. Specifically, in a case where the amount of power generated by the group 6A is insufficient, the first semiconductor switching device 47 is turned OFF and the first open-close unit 44*a* and the second open-close unit 44*b* enter the closed state, the first bypass device 48 forms a path through which the power generated by the other solar cell module groups is transferred to the inverter 3 (the first shut-off device 4).

When the group 6A cannot output sufficient power, the first bypass device 48, which is a diode, is able to immediately form an electric path that bypasses the group 6A in which an abnormality has occurred based on its own electrical characteristics without any command of an external signal.

The plurality of second shut-off devices 5 are connected to electric paths 8*c* to 8*h* connecting between the groups 6C to 6H other than the groups 6A and 6B connected to the electric path 8*a*. The plurality of second shut-off devices 5 cut off the connections between the groups 6C to 6H in response to the second control signal output from the first shut-off device 4 via the communication line 10. In the present embodiment, the plurality of second shut-off devices 5 include three second shut-off devices 5*a* to 5*c*.

The second shut-off device 5*a* is connected to the electric path 8*c* connecting the group 6B and the group 6C, and the electric path 8*d* connecting the group 6C and the group 6D. The second shut-off device 5*b* is connected to the electric path 8*e* connecting the group 6D and the group 6E, and the electric path 8*f* connecting the group 6E and the group 6F. The second shut-off device 5*c* is connected to an electric path 8*g* connecting the group 6F and the group 6G, and an electric path 8*h* connecting the group 6G and the group 6H.

Figure 4:
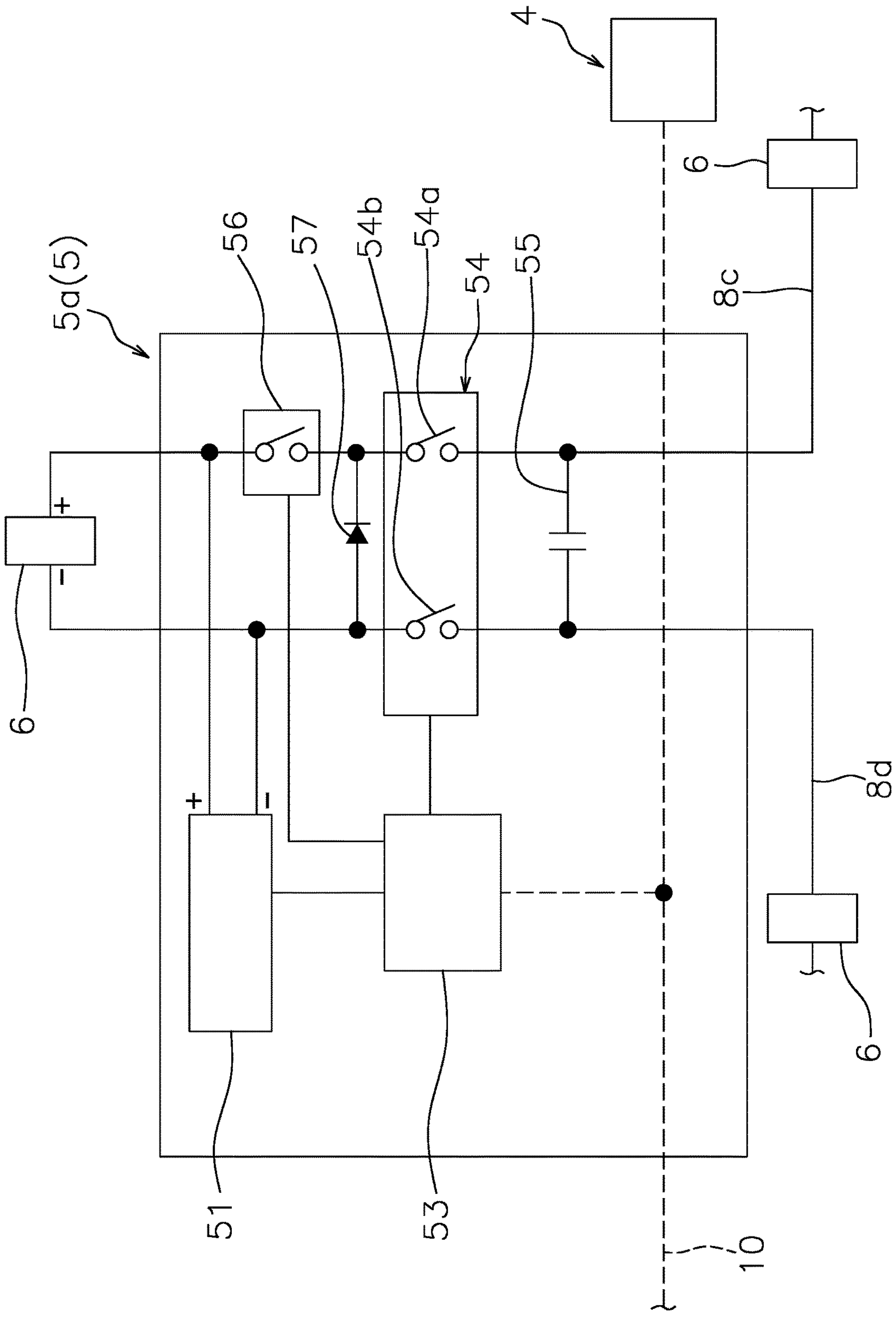
FIG. 4 is a block diagram schematically showing a configuration of a second shut-off device.

FIG. 4 is a block diagram schematically showing a configuration of the second shut-off device 5*a*. The second shut-off device 5*a* includes a power supply unit 51 (an example of the second power supply unit), a control unit 53, a relay 54, a bypass circuit 55, a second semiconductor switching device 56, and a second bypass device 57.

The power supply unit 51 may be a regulator connected in parallel to the solar cell module group. Specifically, the anode-side terminal of the power supply unit 51 is connected to the anode-side terminal of the group 6C, and the cathode-side terminal is connected to the cathode-side terminal of the group 6C. The power supply unit 51 uses the power generated by the solar cell modules 6 as a power source to generate drive power to drive the second shut-off device 5. Here, only the power generated by the solar cell modules 6 of the group 6C is used to generate the power to drive the second shut-off device 5. Note that the configuration of the power supply unit 51 is similar to that of the power supply unit 41 of the first shut-off device 4, and therefore detailed description thereof is omitted.

The control unit 53 includes a CPU and memory. The control unit 53 controls the electric current flowing through the coil of the relay 54 in response to the second control signal from the first shut-off device 4, and controls the opening and closing of the contacts of the relay 54. The relay 44 is, for example, a mechanical relay and is able to open and close a high-voltage direct current. The control unit 53 receives the second control signal from the first shut-off device 4 via a communication interface (not shown) connected to the communication line 10, and opens the contacts of the relay 54. The control unit 53 receives a power supply to drive the relay 54 from the power supply unit 51.

The relay 54 includes a third open-close unit 54*a* and a fourth open-close unit 54*b*. The third open-close unit 54*a* is arranged in the electric path 8*c* to which the anode-side terminal of the group 6C is connected and opens and closes the connection between the group 6B and the group 6C. The third open-close unit 54*a* is connected to the cathode-side terminal of group 6B and the second semiconductor switching device 56. The fourth open-close unit 54*b* is arranged in the electric path 8*d* to which the cathode-side terminal of the group 6C is connected, and opens and closes the connection between the group 6C and the group 6D.

While no drive power is supplied from the power supply unit 51, the third open-close unit 54*a* and the fourth open-close unit 54*b* are in the open state all the time. Accordingly, when the second shut-off device 5*a* is not driven, the connection between the group 6B and the group 6C and the connection between the group 6C and the group 6D are in the cutoff state.

The bypass circuit 55 is a circuit to allow the signal-receiving unit 42 of the first shut-off device 4 to receive the first control signal from the control unit 3*c* by power line communication when the second shut-off devices 5 are in the cutoff state. The bypass circuit 55 enables continuation of the power line communication.

The second semiconductor switching device 56 is connected in series with the third open-close unit 54*a* in the electric path 8*c*. Specifically, the second semiconductor switching device 56 is connected to, at one end, the anode-side terminal of group 6C. The other end of the second semiconductor switching device 56 is connected to the third open-close unit 54*a*. The second semiconductor switching device 56 may, for example, be a MOSFET device or an Insulated Gate Bipolar Transistor (IGBT) device.

The second semiconductor switching device 56 is connected to the control unit 53. The control unit 53 controls to switch between the ON state and the OFF state of the second semiconductor switching device 56.

When the second semiconductor switching element 56 is a MOSFET device or an IGBT device, the control unit 53 is connected to a gate terminal of the second semiconductor switching device 56. The control unit 53 can turn the second semiconductor switching device 56 into an ON state or an OFF state by outputting a predetermined voltage signal to the gate terminal. When a voltage signal is output to the gate terminal to turn the MOSFET device or the IGBT device into the ON state or the OFF state, almost no current flows through the gate terminal. Thus, the MOSFET device or the IGBT device as the second semiconductor switching device 56 can reduce the power required to turn the second semiconductor switching element 56 into the ON state or the OFF state.

In the second shut-off devices 5, when the second semiconductor switching device 56 is turned into the OFF state, the anode-side terminal of the group 6C and the group 6B are cut off. However, even if the second semiconductor switching device 56 is turned OFF, the power supply unit 51 is not cut off from the group 6C. That is, when the second semiconductor switching device 56 is in the OFF state, the power generated by the group 6C is supplied to the power supply unit 51, but not to the inverter 3.

The control unit 53 turns the second semiconductor switching device 56 into the OFF state in a case where the amount of the power generated by the group 6C is smaller than a predetermined threshold. Accordingly, when the amount of the power generated by the group 6C is smaller than the predetermined threshold, the power of the group 6C is supplied only to the second shut-off devices 5 (power supply unit 51). Thus, when the amount of the power generated by the group 6C is small, the power from the group 6C can be used only to drive the third open-close unit 54*a* and the fourth open-close unit 54*b*. As long as the power from the group 6C is supplied only to the third open-close unit 54*a* and the fourth open-close unit 54*b*, even if the amount of the power generated by the group 6C is small or unstable, the third open-close unit 54*a* and the fourth open-close unit 54*b* can be maintained in the closed state (ON state). As a result, the solar power generation system 1 operates stably. The above threshold can be set as, for example, the amount of power with which the third open-close unit 54*a* and the fourth open-close unit 54*b* operate stably even if the power of the group 6C is supplied to both the power supply unit 51 and the inverter 3.

The second shut-off device 5 includes the second semiconductor switching device 56, and thereby the third open-close unit 54*a* and the fourth open-close unit 54*b* can be closed (ON state) even if there occurs an abnormality in the amount of power generated by the group 6C. Therefore, the third open-close unit 54*a* and the fourth open-close unit 54*b* are less likely to open and close while a high voltage is applied to these open-close units. As such, the third open-close unit 54*a* and the fourth open-close unit 54*b* are not required to have a large withstand voltage and can be inexpensive.

The relay 54 of the second shut-off device 5*b* opens and closes the connection between the group 6D and the group 6E and the connection between the group 6E and the 6F. The relay 54 of the second shut-off device 5*c* opens and closes the connection between the group 6F and the group 6G and the connection between the group 6G and the group 6H. The second shut-off device 5*b* and the second shut-off device 5*c* have similar configurations to those of the second shut-off device 5*a* except that the electric circuit to be connected is different from the second shut-off device 5*a*, and therefore detailed description thereof will be omitted.

The second bypass device 57 is connected in parallel to the group 6C. Specifically, the second bypass device 57 is connected, at one end, between the cathode-side terminal of the group 6C and the fourth open-close unit 54*b*. The other end of the second bypass device 57 is connected between the third open-close unit 54*a* and the second semiconductor switching device 56. The second bypass device 57 may, for example, be a diode having an anode connected to the cathode side of the group 6C and a cathode connected between the third open-close unit 54*a* and the second semiconductor switching device 56.

When the solar cell modules of the group 6C are shaded at sunrise or sunset, sufficient power cannot be output from the group 6C due to an abnormality such as a sudden power drop or abnormal heat generation in the group 6C. At that time, the second bypass device 57 forms an electric path that "bypasses" the group 6C and transfers the power generated by the other solar cell module groups. Specifically, the second bypass device 57 forms a path through which the power generated by the other solar cell module groups is transferred to the inverter 3 (first shut-off device 4) when the amount of power generated by the group 6C is insufficient, the second semiconductor switching device 56 is turned in an OFF state, and the third open-close unit 54*a* and the fourth open-close unit 54*b* are closed.

When the group 6C cannot output sufficient power, the second bypass device 57, which is a diode, is able to immediately form an electric path that bypasses the first group 6C in which an abnormality has occurred, based on its own electrical characteristics without any command of an external signal.

Note that the plurality of second shut-off devices 5 in the present embodiment do not have a function to be communication with each other. The plurality of second shut-off devices 5 also do not have a function of outputting a signal from the plurality of second shut-off devices 5 to the first shut-off device 4.

Figure 5:
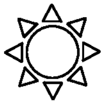
FIG. 5 is a diagram illustrating an example of the operation modes of a shut-off device.
Figure 5:
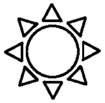
Figure 5:
Figure 5:
Figure 5:
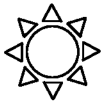

Next, an example of the operation modes of the first shut-off device 4 and the plurality of second shut-off devices 5 will be described with reference to FIG. 5. The operation modes of the first shut-off device 4 and the plurality of second shut-off devices 5 include three of a start mode, an active mode, and a safety mode. The safety mode includes a normal shut-off mode and an emergency safety shut-off mode. Thus, the first shut-off device 4 and the plurality of second shut-off devices 5 operate in four operation modes: a start mode, an active mode, a normal shut-off mode, and an emergency safety shut-off mode.

The start mode is a mode for when sunlight starts to hit the solar cell modules 6. At this time, the solar cell modules 6 receive sunlight and generate power. Then, the first shut-off device 4 is driven by the drive power generated by the power supply unit 41 using the power generated by the solar cell modules 6 and the first shut-off device 4 is driven by the drive power generated by the power supply unit 41 using the power generated by the solar cell modules 6. When the first shut-off device 4 is driven and the control unit 43 receives the first control signal from the control unit 3*c* of the inverter 3 via the signal reception unit 42, the control unit 43 closes the first open-close unit 44*a* and the second open-close unit 44*b* of the relay 44.

Similarly, the second shut-off device 5*a* is driven by the drive power generated by the power supply unit 51 of the second shut-off device 5*a* using the power generated by the solar cell modules 6. When the second shut-off device 5*a* is driven and the control unit 53 receives a command signal from the first shut-off device 4, which is different from the second control signal, for example, the control unit 53 turns the third open-close unit 54*a* and the fourth open-close unit 54*b* of the relay 54 into a closed state. The second shut-off device 5*b* and the second shut-off device 5*c* operate in the same manner as the second shut-off device 5*a*. Consequently, the groups 6A to 6H are connected to the string 2 via the first shut-off device 4 and the second shut-off devices 5*a* to 5*c*, and the power generated by the solar cell modules 6 is output to the inverter 3.

In the start mode (particularly at sunrise) at the time when sunlight begins to hit the solar cell modules 6, the amount of power generated by the solar cell module groups is small. Thus, in the start mode, if the power from the solar cell module groups is used to drive the open-close units and also to be supplied to the inverter 3, it might happen that sufficient power is not provided to drive the open-close units, and thereby even if the open-close units attempt to shift from the open state (OFF state) to the closed state (ON state), they immediately return to the open state (OFF state), and this attempt and return action may be repeated.

Thus, in the start mode, when the amount of power generated by the solar cell module groups connected to the first shut-off device 4 is smaller than a predetermined threshold, the control unit 43 turns the first semiconductor switching device 47 into an OFF state. With this configuration, the power from the solar cell module groups is used only to drive the first open-close unit 44*a* and the second open-close unit 44*b*, and thereby the first open-close unit 44*a* and the second open-close unit 44*b* can be maintained in the closed state (ON state) even if the amount of power generated by the solar cell module groups is small.

As long as the first open-close unit 44*a* and the second open-close unit 44*b* can be maintained in the closed state, the first shut-off device 4 is able to transfer the power generated by the other solar cell module groups to the inverter 3 via the first bypass device 48.

Also, when the amount of power generated by the solar cell module groups connected to the second shut-off devices 5 is smaller than a predetermined threshold, the control unit 53 turns the second semiconductor switching device 56 into an OFF state. With this configuration, the power from the solar cell module groups is used only to drive the third open-close unit 54*a* and the fourth open-close unit 54*b*, and thereby the third open-close unit 54*a* and the fourth open-close unit 54*b* can be maintained in the closed state (ON state) even if the amount of power generated by the solar cell module groups is small.

As long as the third open-close unit 54*a* and the fourth open-close unit 54*b* can be maintained in the closed state, the second shut-off devices 5 are able to transfer the power generated by the other solar cell module groups to the inverter 3 via the second bypass device 57.

After that, when the amount of power generated by the solar cell module groups increases sufficiently (that is, when the amount of power generated by the solar cell module groups exceeds the predetermined threshold), the control units 43 and 53 turn the first semiconductor switching device 47 and the second semiconductor switching device 56 into an ON state, respectively. With this configuration, after the amount of power generated by the solar cell module groups increases sufficiently, it becomes possible to use the power generated by the solar cell module groups to drive the open-close units and to supply the inverter 3.

The active mode is a state in which the solar cell modules 6 receive sunlight during the daytime to generate power, and is substantially the same as the start mode. Thus, in the active mode, the groups 6A to 6H are in connection with each other via the first shut-off device 4 and the second shut-off devices 5*a* to 5*c*, and the power generated by the solar cell modules 6 is output to the inverter 3.

In the active mode, the amount of power generated by the solar cell module groups may decrease due, for example, to a shadow onto the solar cell module groups or an abnormality in a solar cell module(s) in the solar cell module groups. In preparation for such a case, in the active mode, when the amount of power generated by the solar cell module groups connected to the first shut-off device 4 falls below a predetermined threshold, the control unit 43 turns the first semiconductor switching device 47 into an OFF state. With this configuration, the power from the solar cell module groups is used only to drive the first open-close unit 44*a* and the second open-close unit 44*b*. Thus, the first open-close unit 44*a* and the second open-close unit 44*b* can be maintained in the closed state (ON state) even if the amount of power generated by the solar cell module groups is small.

As long as the first open-close unit 44*a* and the second open-close unit 44*b* can be maintained in the closed state, the first shut-off device 4 is able to transfer the power generated by the other normal solar cell module groups to the inverter 3 via the first bypass device 48.

When the amount of power generated by the solar cell module groups connected to the second shut-off devices 5 is smaller than a predetermined threshold, the control unit 53 turns the second semiconductor switching device 56 into an OFF state. With this configuration, the power from the solar cell module groups is used only to drive the third open-close unit 54*a* and the fourth open-close unit 54*b*, and thereby the third open-close unit 54*a* and the fourth open-close unit 54*b* can be maintained in the closed state (ON state) even if the amount of power generated by the solar cell module groups is small.

As long as the third open-close unit 54*a* and the fourth open-close unit 54*b* can be maintained in the closed state, the second shut-off devices 5 are able to transfer the power generated by the other normal solar cell module groups to the inverter 3 via the second bypass device 57.

The normal shut-off mode is a mode for when the solar cell modules 6 are not exposed to sunlight at night or due to the influence of bad weather such as rain. Accordingly, in the normal shut-off mode, the solar cell modules 6 do not generate power. In the normal shut-off mode, the first control signal S1 is output from the control unit 3*c* in the inverter 3. Thus, in the normal shut-off mode, the first open-close unit 44*a* and the second open-close unit 44*b* of the first shut-off device 4 and the third open-close unit 54*a* and the fourth open-close unit 54*b* of the second shut-off devices to 5*c* are all in the open state. Note that, in the normal shut-off mode, no power is generated by the solar cell modules 6, and no drive power is supplied from the solar cell modules 6 to the first shut-off device 4 and the second shut-off devices 5*a* to 5*c*.

At the time of shifting from the start mode or the active mode to the normal shut-off mode, for example, at sunset, the amount of power generated by the solar cell module groups decreases. As such, when shifting to the normal shut-off mode, if the power generated by the solar cell module groups is used both to drive the open-close units and supply to the inverter 3, it might happen that sufficient power is not provided to drive the open-close units, and thereby even if the open-close units attempt to shift from the open state (OFF state) to the closed state (ON state), they immediately return to the open state (OFF state), and this attempt and return action may be repeated.

Thus, at the time of shifting to the normal shut-off mode, when a sufficient amount of power is not available from the solar cell module groups connected to the first shut-off device 4 (that is, when the amount of power generated by the solar cell module groups falls below a predetermined threshold), the control unit 43 turns the first semiconductor switching device 47 into the OFF state. With this configuration, the power from the solar cell module groups is used only to drive the first open-close unit 44*a* and the second open-close unit 44*b*. Thus, even if the amount of power generated by the solar cell module groups is small, the first open-close unit 44*a* and the second open-close unit 44*b* can be maintained in the closed state (ON state).

At the time of shifting to the normal shut-off mode, when a sufficient amount of power is not available from the solar cell module groups connected to the second shut-off devices 5, the control unit 53 turns the second semiconductor switching device 56 into the OFF state. With this configuration, the power from the solar cell module groups is used only to drive the third open-close unit 54*a* and the fourth open-close unit 54*b*, and thereby the third open-close unit 54*a* and the fourth open-close unit 54*b* can be maintained in the closed state (ON state) even if the amount of the power generated by the solar cell module groups.

In the normal shut-off mode, for example, when the power generation by the solar cell modules 6 of the group 6A is unstable due to the unstable weather or the like, the relay 44 is turned into the ON/OFF state depending on the power supplied from the solar cell modules 6 of the group 6A. Also, when the power generation by the solar cell modules 6 of the group 6C is unstable, the relay 54 is turned into the ON/OFF state depending on the power supplied from the solar cell modules 6 of the group 6C. As a result, the relays 44 and 54 may be repeatedly switched between the ON state and the OFF state.

Thus, in a case where the amount of power generated by the solar cell module groups connected to the first shut-off device 4 may become unstable and smaller than a predetermined threshold and also the first open-close unit 44*a* and/or the second open-close unit 44*b* may repeat the open and close actions, the control unit 43 turns the first semiconductor switching device 47 into an OFF state. With this configuration, even if the amount of power generated by the solar cell module groups is unstable and falls below a predetermined threshold value, the power from the solar cell module groups can be used only to drive the first open-close unit 44*a* and/or the second open-close unit 44*b*. Therefore, the first open-close unit 44*a* and/or the second open-close unit 44*b* can be maintained in the closed state (ON state). Further, the first shut-off device 4 is able to transfer the power generated by the normal solar cell module groups to the inverter 3 via the first bypass device 48.

When the amount of power generated by the solar cell module groups connected to the second shut-off devices 5 may become unstable and smaller than a predetermined threshold, and also the third open-close unit 54*a* and/or the fourth open-close unit 54*b* may be repeatedly closed and opened, the control unit 53 turns the second semiconductor switching device 56 into an OFF state. With this configuration, the power from the solar cell module groups is used only to drive the third open-close unit 54*a* and the fourth open-close unit 54*b*, and thereby the third open-close unit 54*a* and the fourth open-close unit 54*b* can be maintained in the closed state (ON state) even if the amount of power generated by the solar cell module groups is unstable and smaller than a predetermined threshold. In addition, the second shut-off devices 5 is able to transfer the power generated by the other normal solar cell module groups to the inverter 3 via the second bypass device 57.

Note that, for example, in the normal shut-off mode, when the amount of power generated by the solar cell module groups is unstable but does not fall below the predetermined threshold value, the control units 43 and 53 are not required to turn the first semiconductor switching device 47 and the second semiconductor switching device 56 into the OFF state.

The emergency safety shut-off mode is a mode in which the electric paths 8*a* to 8*h* are cut off so that the power supply from the solar cell modules 6 to the inverter 3 is stopped during the start mode or the active mode. In the present embodiment, as shown in FIG. 1, when the operation switch 35 is connected to the inverter 3 and the operation switch 35 is operated during the start mode or the active mode of the first shut-off device 4, the operation mode of the first shut-off device 4 is switched to the emergency safety shut-off mode.

Specifically, when the operation switch 35 is operated, the control unit 3*c* stops the output of the first control signal. When the signal detection unit 46 detects the stop of the first control signal of a fixed cycle, the first open-close unit 44*a* and the second open-close unit 44*b* of the relay 44 are turned open via the signal-receiving unit 42 and the control unit 43. At this point of time, the control unit 43 turns the first semiconductor switching device 47 into an OFF state, and then turns the first open-close unit 44*a* and the second open-close unit 44*b* of the relay 44 in the open state. As a result, the connection between the group 6A and the group 6B and the connection between the inverter 3 and the group 6A are cut off, and the output of power from the solar cell modules 6 to the inverter 3 is stopped. At this point of time, the first shut-off device 4 closes the first open-close unit 44*a* and the second open-close unit 44*b* of the relay 44, and then outputs the second control signal to the second shut-off devices 5*a* to 5*c* via the communication line 10.

The second shut-off devices 5*a* to 5*c* receive the second control signal from the first shut-off device 4 and then cut off the connections between the group 6C through the group 6H. At this point of time, the control unit 53 turns the second semiconductor switching device 56 into an OFF state, and then opens the third open-close unit 54*a* and the fourth open-close unit 54*b* of the relay 54. As a result, all the groups 6A to 6H are separated from each other, so that the open circuit voltage of the string 2 is divided into 165V or less.

In the solar power generation system 1 of the above configuration, the first shut-off device 4 and the second shut-off devices 5*a* to 5*c* are in a master-slave relationship, and the second shut-off devices 5*a* to 5*c* cut off the connections between the plurality of solar cell module groups 6B to 6H in response to a second control signal output from the first shut-off device 4. Thus, in the second shut-off devices 5*a* to 5*c*, the functions of the signal-receiving unit 42 and the signal detection unit 46 can be omitted. As a result, the second shut-off devices 5*a* to 5*c* can have a simplified configuration, thereby reducing the installation cost of the plurality of second shut-off devices 5.

Since the plurality of solar cell module groups 6A to 6H each have an open circuit voltage of 165 V or less, a highly safe solar power generation system can be provided. Further, the second control signal from the first shut-off device 4 is output via the communication line 10 by a communication system different from power line communication, and thereby the signal is unlikely to be affected by noise as compared with the power line communication, and the communication from the first shut-off device 4 to the plurality of second shut-off devices 5 can be stabilized.

Further, in the solar power generation system 1 of the above configuration, after the connection between the group 6A and the group 6B is cut off by the first shut-off device 4, the connections between the plurality of solar cell module groups 6B to 6H are cut off by the second shut-off devices 5*a* to 5*c*. Thus, the voltage applied to the second shut-off device 5*a* can be decreased, thereby reducing the cost of the second shut-off devices 5*a* to 5*c*.

Further, in the solar power generation system 1 of the above configuration, when the amount of power generated by the solar cell module groups connected to the first shut-off device 4 falls below a predetermined threshold, the first semiconductor switching device 47 of the first shut-off device 4 is turned into an OFF state. Thus, when the amount of power generated by the solar cell module groups is small, the electric path from the groups to the inverter 3 is cut off, and the groups can supply power only to the power supply unit 41. That is, when the amount of power generated by the groups is small, the power generated by the groups is used only to drive the first open-close unit 44*a* and the second open-close unit 44*b*. As a result, the first open-close unit 44*a* and the second open-close unit 44*b* can be maintained in the closed state (ON state) even if the amount of power generated by the group is small. As a result, the solar power generation system 1 operates stably.

In addition, in the solar power generation system 1 of the above configuration, when the amount of power generated by the solar cell module groups connected to the second shut-off devices 5 falls below a predetermined threshold, the second semiconductor switching device 56 is turned into an OFF state. Thus, when the amount of power generated by the solar cell module groups is small, the power generated by the groups is used only to drive the third open-close unit 54*a* and the fourth open-close unit 54*b*. As a result, the third open-close unit 54*a* and the fourth open-close unit 54*b* can be maintained in the closed state (ON state) even if the amount of power generated by the groups is small. As a result, the solar power generation system 1 operates stably.

One embodiment of the present invention has been described above, but the claimed invention is not limited to the above embodiment, and various modifications are possible as long as the modifications are within the scope of the claims.

Figure 6:
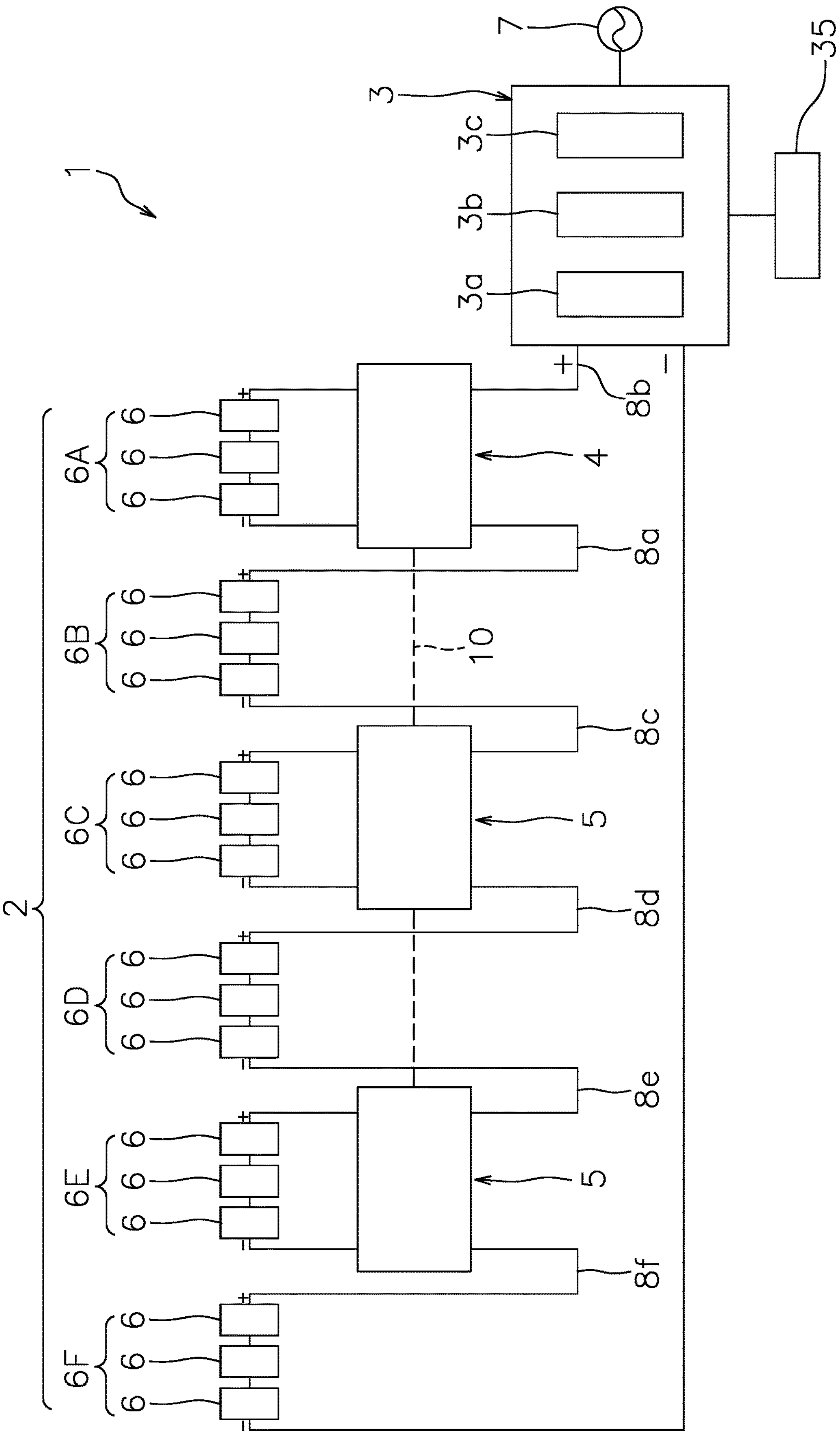
FIG. 6 is a block diagram schematically showing a configuration of a solar power generation system according to another embodiment.

The number of groups of the plurality of solar cell module groups is not limited to the above embodiment. The string 2 may be divided into a plurality of solar cell module groups as long as each group has an open circuit voltage of 165 V or less. For example, as shown in FIG. 6, each of the plurality of solar cell module groups 6A to 6F may include three directly connected solar cell modules 6. That is, the plurality of solar cell module groups may be divided by the first shut-off device 4 and the plurality of second shut-off devices 5 so that a plurality of solar cell module groups each include three solar cell modules 6 connected in series. Although not shown in FIG. 6, the first shut-off devices 4*a* and 4*b* have the first semiconductor switching device 47, and the second shut-off devices 5*a* and 5*b* have the second semiconductor switching device 56.

Figure 7:
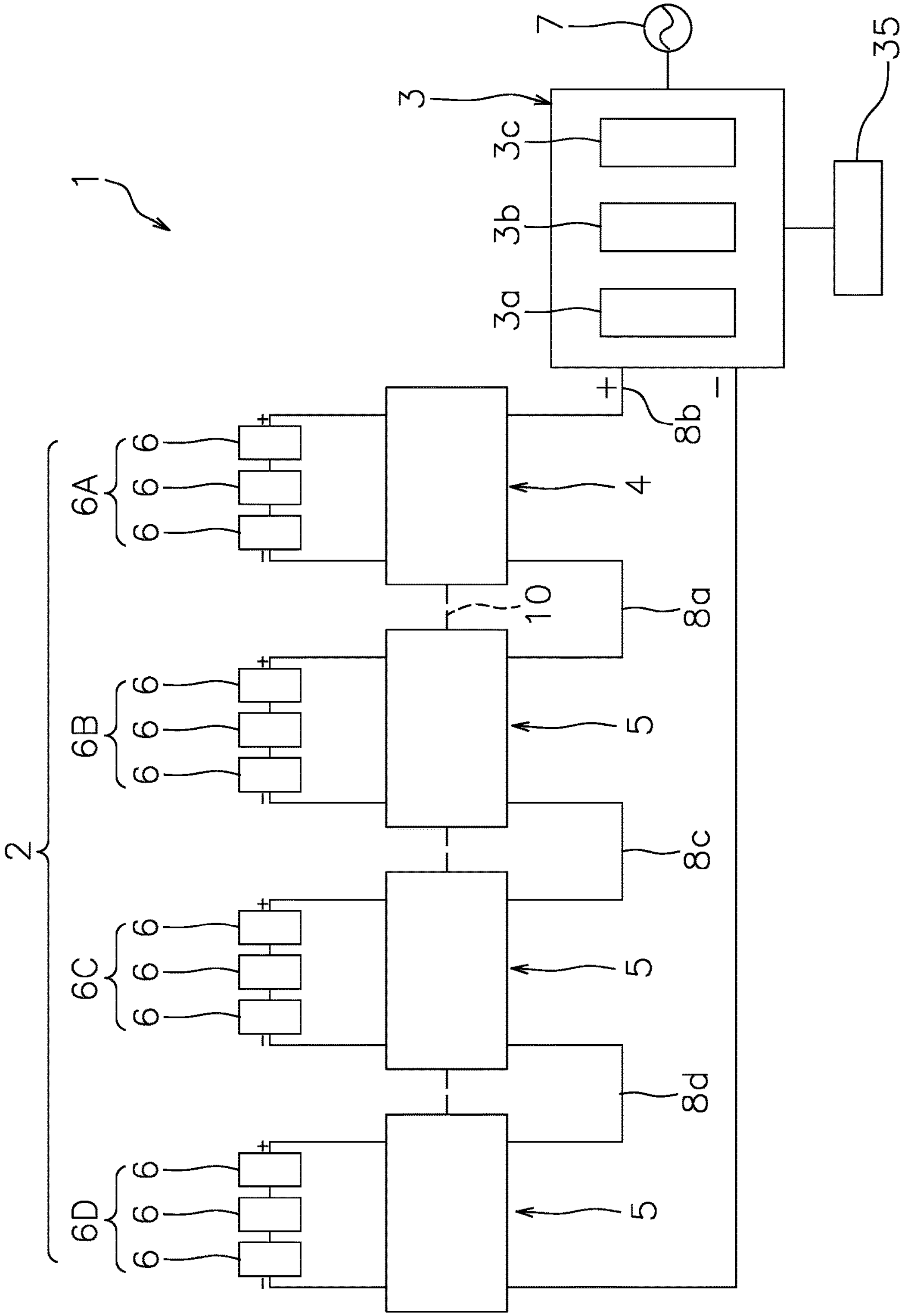
FIG. 7 is a block diagram schematically showing a configuration of a solar power generation system according to another embodiment.

Further, as shown in FIG. 7, the plurality of second shut-off devices 5 each may be disposed in each of the plurality of solar cell module groups except the group (the group 6A here) to which the first shut-off device 4 is connected. Although not shown in FIG. 7, the first shut-off devices 4*a* and 4*b* have the first semiconductor switching device 47, and the second shut-off devices and 5*b* have the second semiconductor switching device 56.

Figure 8:
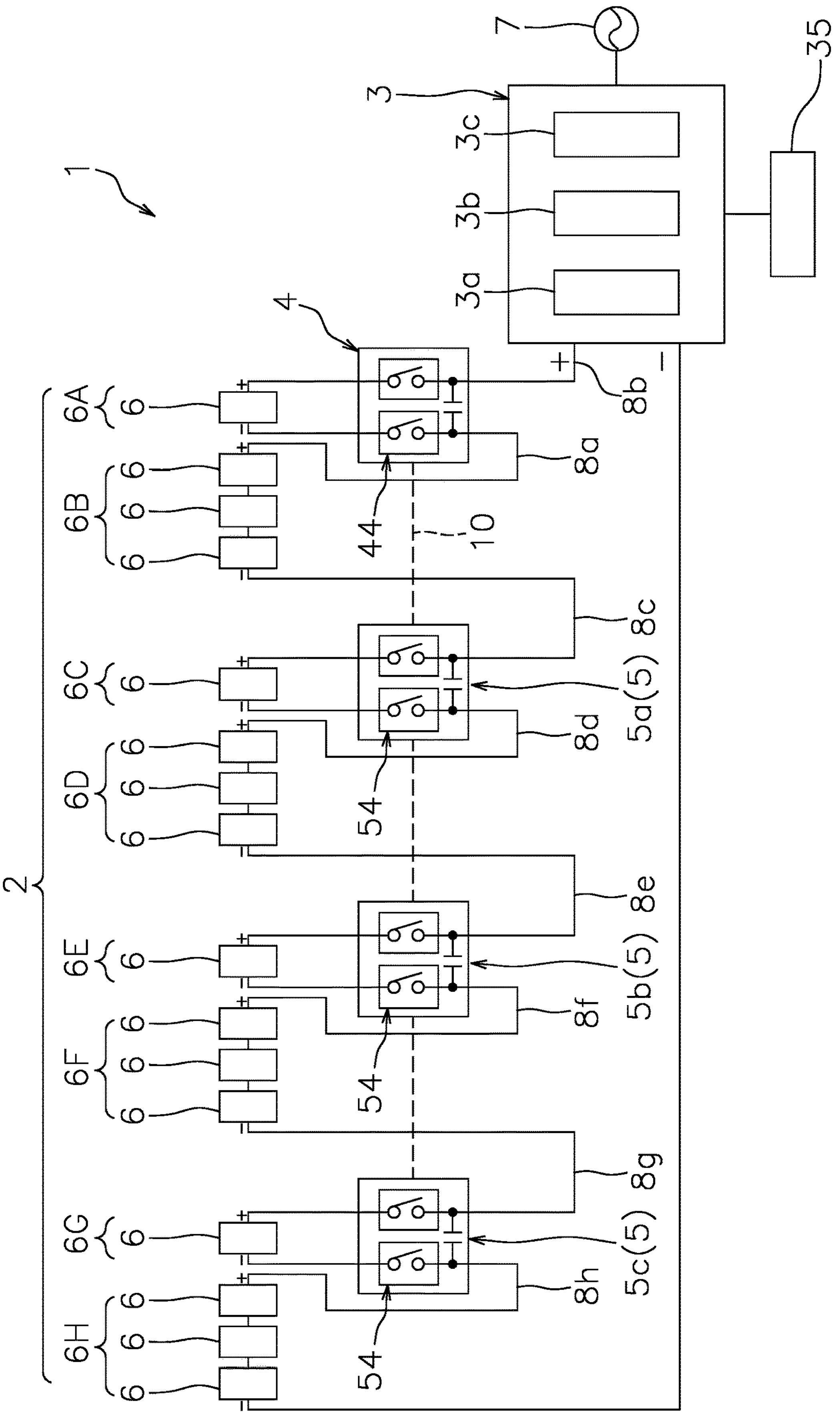
FIG. 8 is a block diagram schematically showing a configuration of a solar power generation system according to another embodiment.

In the above embodiment, the relay 44 of the first shut-off device 4 has two contacts of the first open-close unit 44*a* and the second open-close unit 44*b*, but as shown in FIG. 8, the relay 44 may be two relays having a single contact. That is, the control unit 43 of the first shut-off device 4 may be configured to independently control the opening and closing of the first open-close unit 44*a* and the second open-close unit 44*b*. Similarly, in the plurality of second shut-off devices 5 also, the control unit 53 may be configured to be able to independently control the third open-close unit 54*a* and the fourth open-close unit 54*b* of the relay 54. Although not shown in FIG. 8, the first shut-off device 4 includes a first semiconductor switching device 47, and the second shut-off devices 5 include the second semiconductor switching device 56.

In the above embodiment, the first shut-off device 4 is connected to the electric path 8*a* connecting the group 6A and the group 6B and the electric path 8*b* connecting the inverter 3 and the group 6A. However, the arrangement of the first shut-off device 4 may be exchanged with that of the plurality of second shut-off devices 5. For example, the first shut-off device 4 may be connected to the electric path 8*c* and the electric path 8*d*, and the second shut-off device 5*a* may be connected to the electric path 8*a* and the electric path 8*b*.

In the above embodiment, the first control signal is output to the first shut-off device 4 by power line communication, but as shown in FIG. 8, the first signal may be output to the first shut-off device 4 by wireless communication such as Wi-Fi®. Alternatively, the inverter 3 and the first shut-off device 4 may be configured to be in communication with each other by wireless communication.

The first control signal S1 and the second control signal S2 may be always output in modes other than the emergency safety shut-off mode or part of the normal shut-off mode (when "NO" in "POWER GENERATION" in FIG. 5), and the output of the first control signal S1 and the second control signal S2 may be stopped in the emergency safety shut-off mode and part of the normal shut-off mode. In this case, the first shut-off device and the second shut-off device close the open-close units upon receiving the first control signal S1 and the second control signal S2, and open the open-close units while not receiving the first control signal S1 and the second control signal S2.

According to the present invention, a solar power generation system can be provided that decreases the installation cost of shut-off devices and that improves stability of the solar power generation system.

1 Solar power generation system
2 String
3 Inverter
4 First shut-off device
5*a* to 5*c* Second shut-off devices
6 Solar cell module
6A to 6H Solar cell module groups
44*a* First open-close unit
44*b* Second open-close unit
47 First semiconductor switching element
48 First bypass element
54*a* Third open-close unit
54*b* Fourth open-close unit
56 Second semiconductor switching element
57 Second bypass element

The invention claimed is:

1. A solar power generation system, comprising:

a string including a plurality of solar cell module groups connected in series with each other, the solar cell module groups each including one or more solar cell modules connected in series;

an inverter connected to the string and configured to convert DC power output from the string to AC power;

a first shut-off device connected to a first electric path connecting some of the plurality of solar cell module groups; and a second shut-off device connected to a second electric path connecting others of the plurality of solar cell module groups different from the plurality of solar cell module groups connected by the first electric path, wherein each of the plurality of solar cell module groups in the string each has an open circuit voltage equal to or less than a predetermined open circuit voltage, the first shut-off device cuts off the connections between said some of the plurality of solar cell module groups connected to the first electric circuit in response to a first control signal from the inverter, the second shut-off device cuts off the connections between said others of the solar cell module groups connected to the second electric circuit in response to a second control signal output from the first shut-off device by a communication system different from power line communication and sent to the second shut-off device by a communication line connected between the first shut-off device and the second shut-off device, the plurality of solar cell module groups in the string includes a first group, and the first shut-off device includes a first open-close unit connected to an anode-side terminal of the first group;

a first semiconductor switching device connected in series between the anode-side terminal of the first group and the first open-close unit; and a first power supply unit configured to generate power to drive the first open-close unit, the first power supply unit having an anode-side terminal connected between the anode-side terminal of the first group and the first semiconductor switching device, and a cathode-side terminal connected to a cathode-side terminal of the first group, the first semiconductor switching device being configured to enter an OFF state in a case where an amount of power generated by the first group falls below a predetermined threshold.

2. The solar power generation system according to claim 1, wherein the first shut-off device includes a first bypass device that is connected at one end to the cathode-side terminal of the first group and that is connected at another end between the first open-close unit and the first semiconductor switching element.

3. The solar power generation system according to claim 1, wherein the first semiconductor switching device is a MOSFET device or an IGBT device.

4. The solar power generation system according to claim 1, wherein the first shut-off device includes a second open-close unit connected to the cathode-side terminal of the first group.

5. The solar power generation system according to claim 4, wherein the second open-close unit is driven by the power supplied from the first power supply unit.

6. The solar power generation system according to claim 4, wherein the first shut-off device is configured to control the opening and closing of the first open-close unit and the second open-close unit independently of each other.

7. The solar power generation system according to claim 1, wherein the plurality of solar cell module groups in the string includes a second group, and the second shut-off device includes a third open-close unit connected to an anode-side terminal of the second group;

a second semiconductor switching device connected in series between the anode-side terminal of the second group and the third open-close unit, and a second power supply unit configured to generate power to drive the third open-close unit, the second power supply unit having an anode-side terminal connected between the anode-side terminal of the second group the second semiconductor switching device, and a cathode-side terminal connected to a cathode-side terminal of the second group, the second semiconductor switching device being configured to enter an OFF state in a case where the amount of power generated by the second group falls below a predetermined threshold.

8. The solar power generation system according to claim 7, wherein the second shut-off device includes a second bypass device, the second bypass device being connected at one end to the cathode-side terminal of the second group and being connected at another end between the third open-close unit and the second semiconductor switching element.

9. The solar power generation system according to claim 7, wherein the second semiconductor switching device is a MOSFET device or an IGBT device.

10. The solar power generation system according to claim 7, wherein the second shut-off device includes a fourth open-close unit connected to the cathode-side terminal of the second group.

11. The solar power generation system according to claim 10, wherein the fourth open-close unit is driven by the power supplied from the second power supply unit.

12. The solar power generation system according to claim 10, wherein the second shut-off device is configured to control the opening and closing of the third open-close unit and the fourth open-close unit independently of each other.

13. The solar power generation system according to claim 1, wherein the first shut-off device cuts off the connection between the plurality of solar cell module groups connected to the first electric path in response to the first control signal from the inverter and then outputs the second control signal to the second shut-off device.

14. The solar power generation system according to claim 1, wherein each of the plurality of solar cell module groups in the string has an open circuit voltage of 165 V or less.

15. The solar power generation system according to claim 1, wherein the inverter outputs the first control signal to the first shut-off device by power line communication.

16. The solar power generation system according to claim 1, wherein the inverter outputs the first control signal to the first shut-off device by wireless communication.

17. The solar power generation system according to claim 1, wherein at least one of the plurality of solar cell module groups in the string includes a plurality of solar cell modules connected in series.

* * * * *